(12) United States Patent
Yermakov et al.

(10) Patent No.: US 10,102,286 B2
(45) Date of Patent: Oct. 16, 2018

(54) LOCAL OBJECT INSTANCE DISCOVERY FOR METRIC COLLECTION ON NETWORK ELEMENTS

(71) Applicant: Level 3 Communications, LLC, Broomfield, CO (US)

(72) Inventors: Sergey Yermakov, Littleton, CO (US); Pete Joseph Caputo, II, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 306 days.

(21) Appl. No.: 14/722,875

(22) Filed: May 27, 2015

(65) Prior Publication Data

US 2016/0352595 A1 Dec. 1, 2016

(51) Int. Cl.
*G06F 17/30* (2006.01)
*H04L 12/24* (2006.01)
*H04L 12/26* (2006.01)
*G06F 15/16* (2006.01)

(52) U.S. Cl.
CPC .... *G06F 17/30864* (2013.01); *H04L 41/0233* (2013.01); *H04L 41/0806* (2013.01); *H04L 41/0853* (2013.01); *H04L 43/065* (2013.01); *H04L 41/0213* (2013.01)

(58) Field of Classification Search
CPC .......... G06F 17/30864; H04L 41/0213; H04L 41/0233; H04L 41/0806; H04L 41/0853; H04L 43/065
USPC ................................................ 709/203–238
See application file for complete search history.

(56) References Cited

U.S. PATENT DOCUMENTS

| | | | |
|---|---|---|---|
| 6,363,421 B2* | 3/2002 | Barker | H04L 41/0213 709/202 |
| 6,788,315 B1 | 9/2004 | Kekic et al. | |
| 7,216,350 B2* | 5/2007 | Martin | H04M 3/42 379/201.01 |
| 8,667,113 B2* | 3/2014 | Veerabhadrappa | H04L 41/0213 709/223 |
| 9,191,286 B2* | 11/2015 | Lachapelle | G06F 11/3495 |
| 9,917,753 B2* | 3/2018 | Captuo, II | H04L 41/0213 |
| 2003/0074436 A1* | 4/2003 | Gieseke | H04L 41/0213 709/223 |

(Continued)

OTHER PUBLICATIONS

International Search Report dated Aug. 25, 2016, Int'l Appl. No. PCT/US16/033189, Int'l Filing Date May 19, 2016, 3 pgs.

(Continued)

*Primary Examiner* — Moustafa M Meky
*Assistant Examiner* — Thorne E Waugh

(57) ABSTRACT

In an embodiment, a computer-implemented method collects metrics on a network element. The method includes receiving, on the network element, a specification of the objects on the network element to monitor. The network element queries an object data structure representing management information of the network element to identify instances of each of the specified objects. For respective instances identified, the network element queries the object data structure for metric values associated with the respective instance. Finally, data representing the instance and the associated metric value is transmitted from the network element to a network information server over a network.

22 Claims, 4 Drawing Sheets

(56) References Cited

U.S. PATENT DOCUMENTS

| | | | |
|---|---|---|---|
| 2003/0225876 A1* | 12/2003 | Oliver | H04L 41/22 709/224 |
| 2005/0259571 A1* | 11/2005 | Battou | G06F 8/65 370/217 |
| 2006/0112175 A1 | 5/2006 | Sellers et al. | |
| 2008/0082661 A1* | 4/2008 | Huber | H04L 41/046 709/224 |
| 2016/0092537 A1* | 3/2016 | Vieira | G06F 17/30575 707/634 |

OTHER PUBLICATIONS

Written Opinion of the International Searching Authority dated Aug. 25, 2016, Int'l Appl. No. PCT/US16/033189, Int'l Filing Date May 19, 2016, 4 pgs.

International Preliminary Report on Patentability dated Nov. 28, 2017, Int'l Appl. No. PCT/US16/033189, Int'l Filing Date May 19, 2016, 6 pgs.

\* cited by examiner

US 10,102,286 B2

LOCAL OBJECT INSTANCE DISCOVERY FOR METRIC COLLECTION ON NETWORK ELEMENTS

BACKGROUND

Technical Field

Embodiments generally relate to network metric collection.

Background

A communication network may, for example, provide a network connection that allows data to be transferred between two geographically remote locations. A network may include network elements connected by links. The network elements may be any type of managed device on the network, including routers, access servers, switches, bridges, hubs, IP telephones, IP video cameras, computer hosts, and printers. Network elements can be physical or logical and can communicate with one another via interconnected links.

Networks may also provide clients with statistics, reports, and other information related to their elements and their performance. For example, clients may wish to see how much their traffic is delayed by the network, whether the service is meeting service level agreements, whether the network is causing a bottleneck, etc.

To collect metrics, a standard protocol, such as Simple Network Management Protocol (SNMP), may be used. SNMP is part of the Internet Protocol Suite as defined by the Internet Engineering Task Force (IETF). It includes of a set of standards for network management, including an application layer protocol, a database schema, and a set of data objects.

The database schema SNMP uses is defined by a management information base (MIB). The MIB describes the structure of the management data of a device subsystem. It uses a tree-like hierarchical namespace, dividing objects into categories, and, in some cases, the categories into further categories. The objects can be specified by object identifiers (OID). An object can include one or more object instances (identified by their OIDs). An object may be scalar, including a single object instance, or tabular, including multiple related object instances that are grouped and listed in a sequence.

SNMP may support a query providing for discovery of the instances available for an object. The instances may be specified by suffixes to the object identifiers. Then, the instance and the object identifier together may be used to retrieve the value for the instance.

SUMMARY

In an embodiment, a computer-implemented method collects metrics on a network element. The method includes receiving, on the network element, a specification of the objects on the network element to monitor. The network element queries an object data structure representing management information of the network element to identify instances of each of the specified objects. For respective instances identified, the network element queries the object data structure for metric values associated with the respective instance. Finally, data representing the instance and the associated metric value is transmitted from the network element to a network information server over a network.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Generally, the left-most digit(s) of a reference number identifies the drawing in which the reference number first appears.

DETAILED DESCRIPTION

As described above, a standard protocol, such as SNMP, is often used to collect metrics from network elements. A remote server, such as a network management server, may be used to collect the data. To collect data, a network management server may have to first discover what object instances are available and then send messages requesting data for the object instances. These requests can take time and place additional burden on the network.

According to embodiments, the network element itself discovers which object instances are available, collects data for the object instances and transmits the collected data to the network management server. By placing the discovery and collection on the network element, as opposed to the network management server, embodiments can quicken the time to receive metrics from new instances and reduce the burden on the network.

Figure 1:
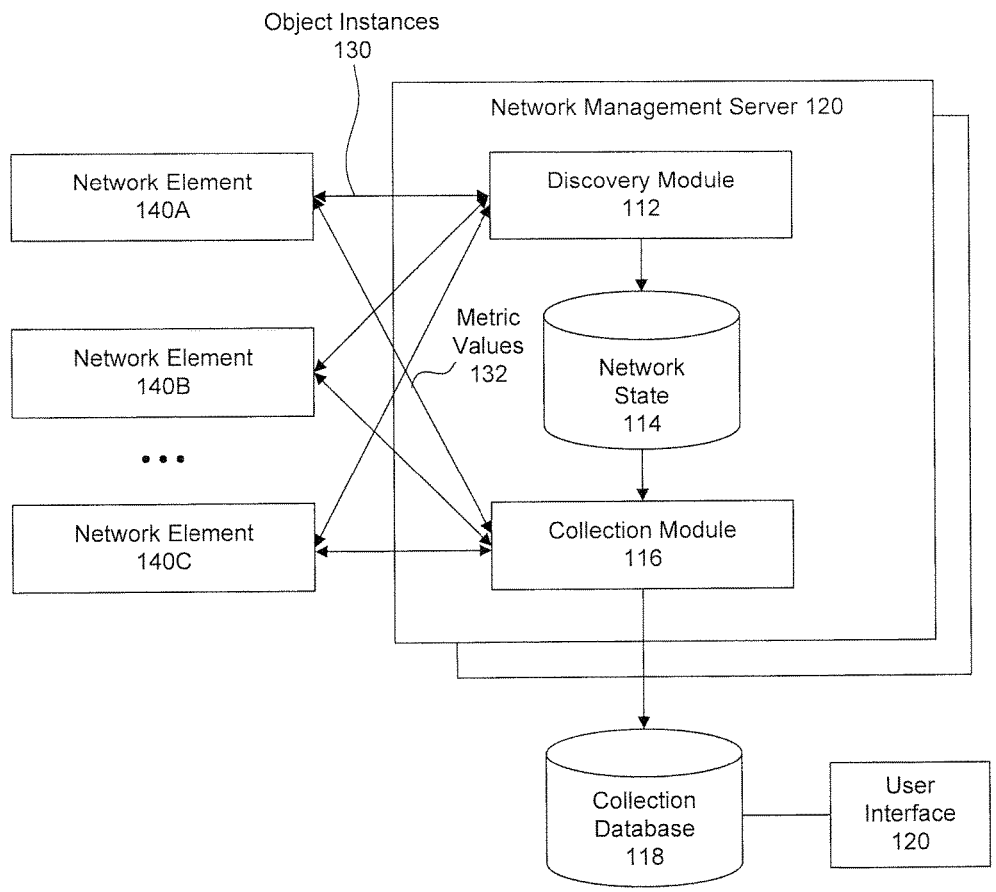
FIG. 1 illustrates a network environment where a network management server discovers new object instances and collects data for each object instance.
Figure 2:
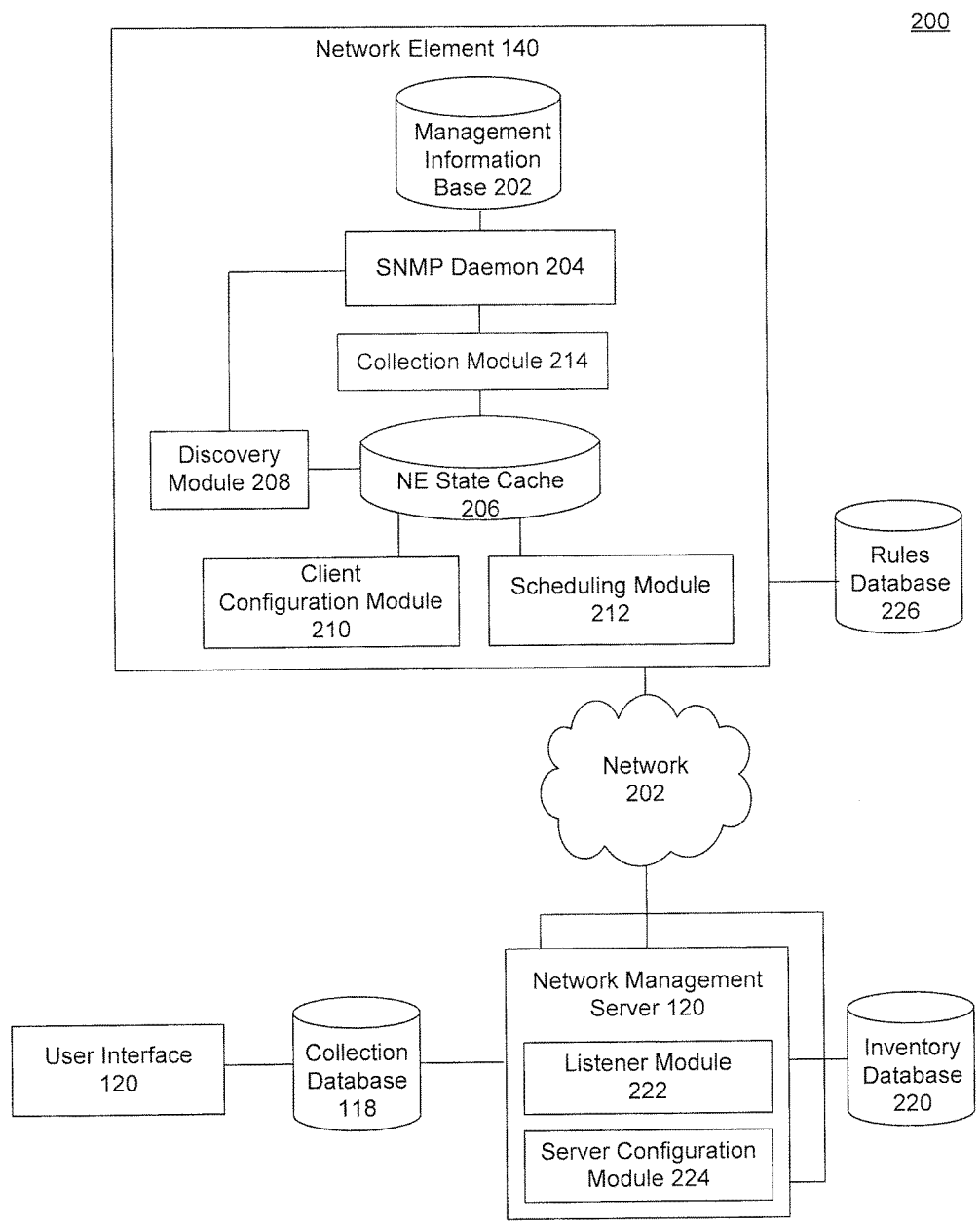
FIG. 2 illustrates a network environment where the network element itself discovers new object instances and services, and pushes values of the discovered instances to a network management server, according to an embodiment.

In the description that follows, a system where the network management server discovers and collects network management data is first described with respect to FIG. 1. Then, with respect to FIG. 2, a system is described that uses the network element to discover and collect network management data, according to embodiments. Finally, operation of the system of FIG. 2 is described with respect to FIGS. 3 and 4.

FIG. 1 illustrates a network environment 100 where a network management server discovers new object instances and collects data for each object instance. Network environment 100 includes a network management server 120 and a plurality of network elements 140A-C. Network management server 120 may include a discovery module 112, a network state 114, and a collection module 116. Each component is described in turn.

Discovery module 112 discovers instances on each network element. Discovery module 112 may know each network element to collect data from and may have a list of objects that it is interested in, identified by their object IDs. Discovery module 112 may send requests to each of the network elements it is interested in, illustrated in FIG. 1 as elements 140A-C. Each network element may return the available object instances as object instance 130. When the objects are stored in a treelike hierarchy, the instances may be all of the object's children. They may, for example, be an entire subtree with the object specified by an object identifier as its root. The requests and response may be formatted according to SNMP. The object instances may also have an object ID. For example, the object instances may have the object's ID, appended with a new suffix. The object instances for each network element are stored in network state 114.

Network state 114 stores a list of all the relevant object instances in network environment 100. In one example, network state 114 may store an identification of each network element 140 and corresponding object instances 130 retrieved by discovery module 112. Network state 114 is read by collection module 116.

Collection module 116 periodically retrieves values for each instance in network state 114. Collection module 116 may periodically iterate through the object list and network state 114, sending requests to network element 140A-C for the metric values corresponding to each listed object instance. In response, collection module 116 may receive metric values 132 corresponding to each requested object instance from the respective network elements 140A-C. As before, the request and response may be formatted according to SNMP. Once retrieved, collection module 116 stores the metric values into a collection database 118.

Collection database 118 stores current and historical data on network environment 100. In one example, a user interface 120 may enable a user to review the current and historical network data in collection database 118.

As mentioned above, the discovery and collection process can take time, perhaps hours. Further, the requests back and forth between the network elements and the network management server can consume additional network, memory, and processor overhead. Also, as illustrated in FIG. 1, multiple network management servers may be used for redundancy and back up. This compounds the overhead required to maintain the network state on each server. For these reasons, embodiments have individual network elements discover their own objects and collect their own metrics.

FIG. 2 illustrates a network environment 200 where the network element itself discovers new object instances and services, and pushes values of the discovered instances to the network management server. Similar to network environment 100 in FIG. 1, Network environment 200 includes network element 140 and network management server 120. Network element 140 and network management server 120 are connected by a network 202. Like in FIG. 1, network management server 120 is coupled to collection database 118, which in turn is coupled to user interface 120.

Figure 3:
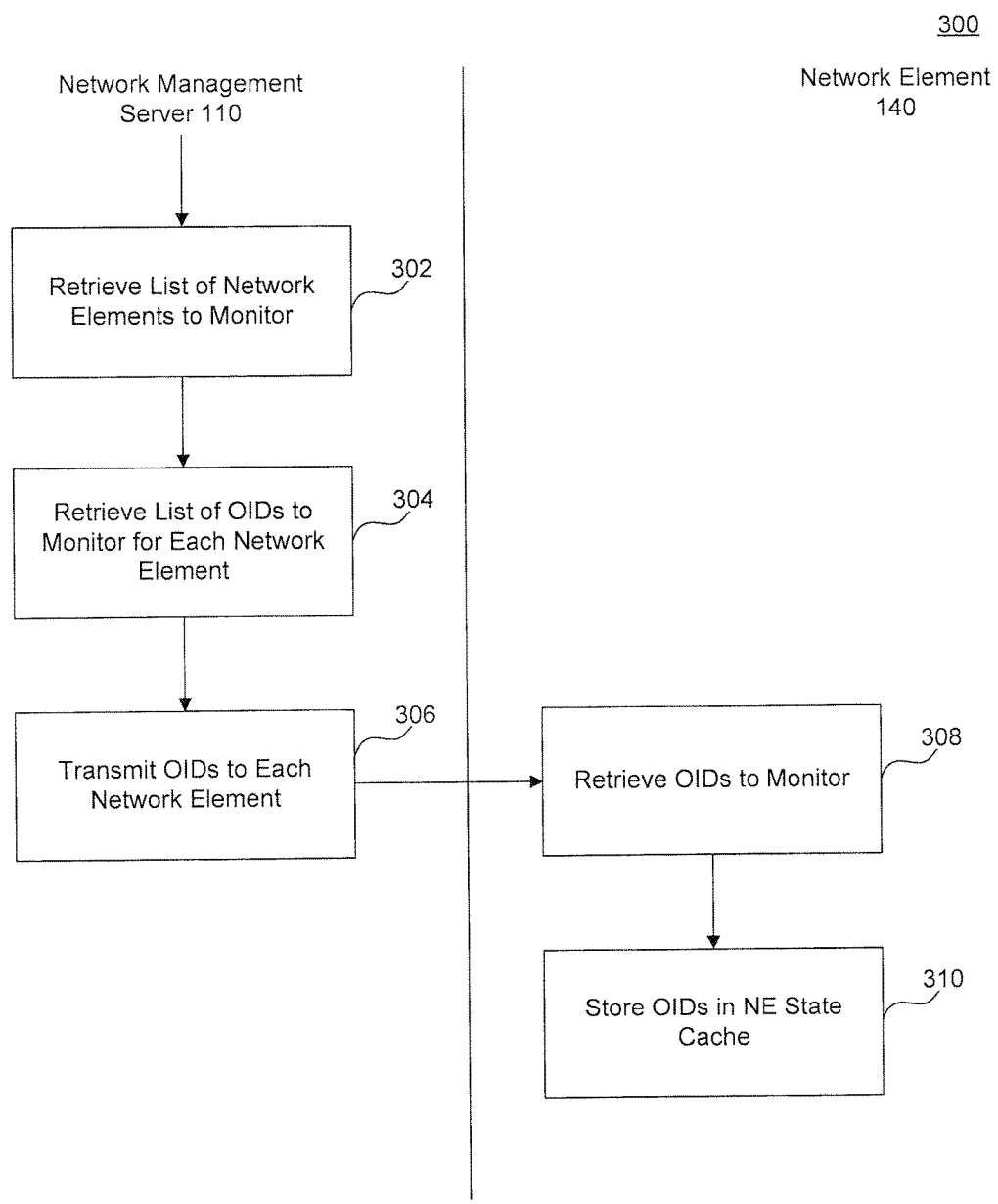
FIG. 3 illustrates a method of discovering object instances in the network environment of FIG. 2.
Figure 4:
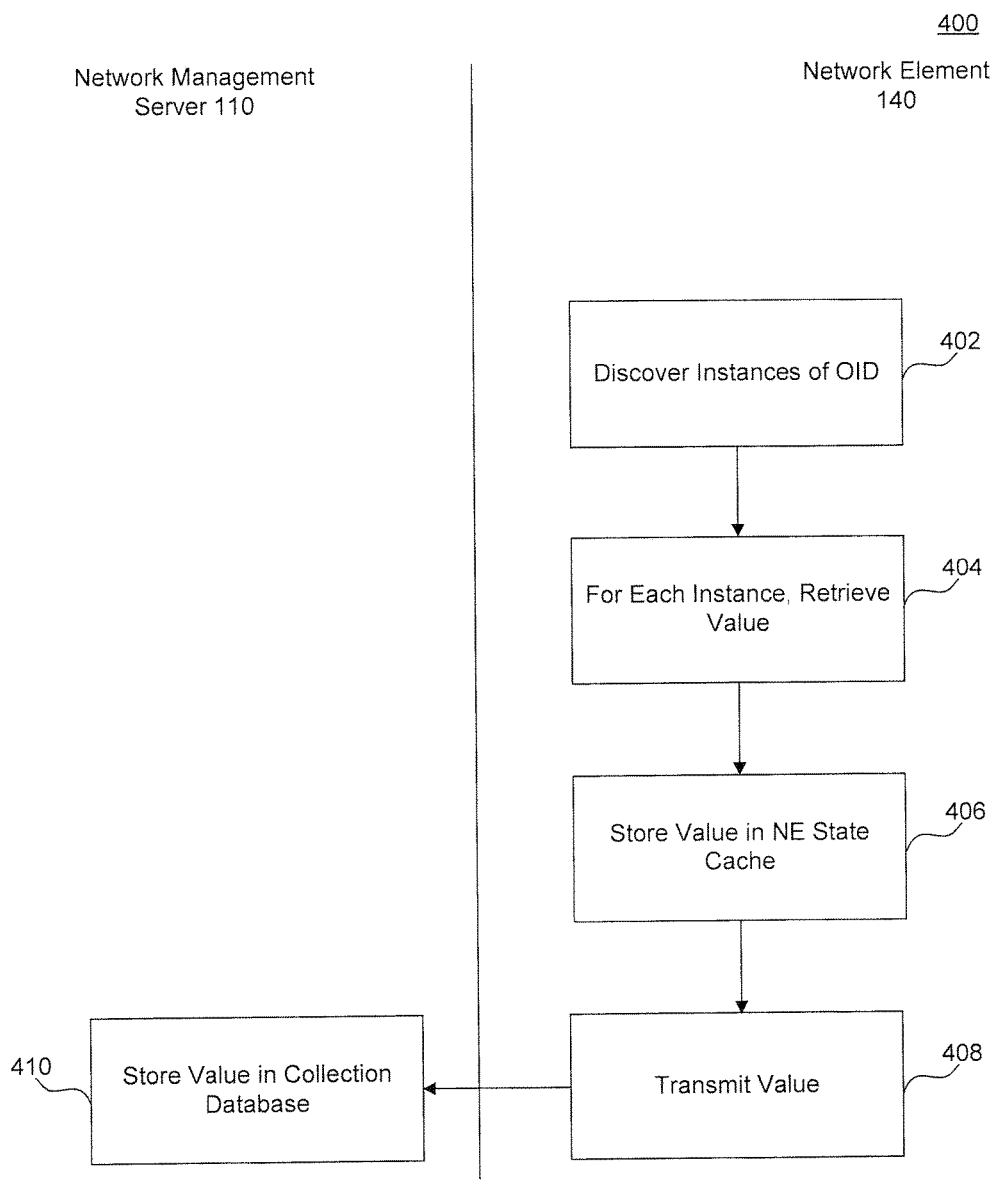
FIG. 4 illustrates a method of transmitting values for the object instances in the network environment of FIG. 2.

The operation of network environment 200 is described with respect to FIGS. 3 and 4. FIG. 3 illustrates a method of discovering object instances in the network environment of FIG. 2. FIG. 4 illustrates a method of transmitting values for the object instances in the network environment of FIG. 2.

In FIG. 2, network management server 120 is coupled to an inventory database 220. Inventory database 220 tracks different users, their associated network services, and the routing devices used to provide the network services. Inventory database 220 may have a record for every network element 140 in network environment 200. When a new network element is added, a record for the network element may also be added to inventory database 220. And when a network element is removed, a record for the network element may be removed from inventory database 220.

Network management server 120 includes a server configuration module 224 that uses inventory database 220.

From inventory database 220, server configuration module 224 retrieves a list of network elements to monitor. This retrieval is illustrated in FIG. 3 at step 302.

Once the list of network elements is retrieved at step 302, server configuration module 224 retrieves a list of objects to watch for at step 304. The objects may be identified by object identifiers (OIDs). Referring back to FIG. 2, the object identifiers may be stored in a rules database 226. In one embodiment, the same set of objects may be the observed for every network element. In another embodiment, different objects may be observed for different types of network elements. For example, different objects may be observed in firewalls than in switches. Rules database 226 may specify which objects are to be observed for different types of network elements. In a third embodiment, specific network elements, for example specific switches, may have particular objects to be observed. Again, in that embodiment, rules database 226 may map specific network elements to particular rules.

In addition to specifying particular objects, rules database 226 may specify categories of objects to observe. For example, rules database 226 may identify entire portions of the object hierarchy tree to observe.

After retrieving the network elements and objects to monitor, server configuration module 224 transmits a specification of the objects to be observed to associated network elements at step 306. As illustrated in FIG. 2, the specification of objects may be sent over network 202. As mentioned above, the objects may be specified using OIDs.

Each OID may be a sequence of integers separated by decimal points. An example of an OID is 1.3.6.1.2.1.4.6. Each OID may have a textual description as well. For example the textual description of 1.3.6.1.2.1.4.6 may be iso.org.dod.internet.mgmt.mib-2.ip.ipForwDatagrams. In that example, the ipForwDatagrams object may be an integer counter that stores the number of forwarded datagrams at a router. As mentioned above, the specification may include a list of specific objects, for example, 1.3.6.1.2.1.4.4, 1.3.6.1.2.1.4.5, and 1.3.6.1.2.1.4.6. Or the specification may designate an entire portion of the object hierarchy, for example, 1.3.6.1.2.1.4.*. After the specification is transmitted, it is received by network element 140.

To receive the specification, network element 140 may use a client configuration module 210. Configuration module 210 may store the objects sought to be tracked in a network element (NE) state cache 206. Network element state cache 206 may be a table with objects to be watched, their associated instances, if any, and the most recent value for those instances. For example, suppose that configuration module 210 received a request to monitor the ipForwDatagrams object above, which is scalar, and two other objects: (1) 1.3.6.1.2.1.4.5 (iso.org.dod.internet.mgmt.mib-2.ip.ipInAddrErrors), which is a scalar value for the number of input datagrams discarded because the IPv4 address in their IPv4 header's destination field was not a valid address; and (2) 1.3.6.1.2.1.2.2.1.2 (iso.org.dod.internet.mgmt.mib-2.system.ifTable.ifEntry.ifDescr), which is tabular list of textual strings about each interface. In that example, after receiving the specification at the client configuration module 210, the NE state cache 206 may be:

| OIDs to Monitor | Instances | Values |
|---|---|---|
| 1.3.6.1.2.1.4.5 (ipInAddrErrors) | NULL | NULL |
| 1.3.6.1.2.1.4.6 (ipForwDatagrams) | NULL | NULL |
| 1.3.6.1.2.1.2.2.1.2 (ifDescr) | NULL | NULL |

In this example, NE state cache 206 lists the three OIDs specified. Because the network element has not yet checked to determine what OIDs are instantiated and what their values are, the table has null values for the other fields. Storing the OIDs in the NE state cache is illustrated as step 310 in FIG. 3.

After the OIDs to be watched are stored in NE state cache 206 at step 310, a discovery module 208 on network element 140 discovers which objects are instantiated. This may involve an SNMP call to network element 140's SNMP daemon 204. SNMP daemon 204 may be a process acting as an SNMP agent that service requests and provides access to network element 140's management information base (MIB) 202.

Once discovery module 208 determines which objects are instantiated, it may store that information into NE state cache 206. If multiple instantiations exist for object, it may store all the instantiations in the NE state cache 206. This discovery process is represented by step 402 in FIG. 4. In the example above, after the discovery process, NE state cache 206 may appear as follows:

| OIDs to Monitor | Instances | Values |
|---|---|---|
| 1.3.6.1.2.1.4.5 (ipInAddrErrors) | NULL | NULL |
| 1.3.6.1.2.1.4.6 (ipForwDatagrams) | 0 | NULL |
| 1.3.6.1.2.1.2.2.1.2 (ifDescr) | 1 | NULL |
| | 2 | NULL |
| | 3 | NULL |
| | 4 | NULL |

In this example, MIB 202 may have instantiations for the ipForwDatagrams and ifDescr objects, but not the ipInAddrErrors, which, as indicated above, indicates the number of packets lost due to addressing errors. For example, it may be that MIB 202 has not recorded any address errors or does not support tracking of address errors. It also may be that in MIB 202's particular version, ipInAddrErrors has been deprecated. Regardless, because no instantiation of ipInAddrErrors exists on MIB 202, the example table above still shows a null value for that object.

However, in this example, the ipForwDatagrams and ifDescr objects do have instantiations. ipForwDatagrams, being a scalar object, only has a single instance, indicated by the "0" entry, and ifDescr, being a tabular object, has a total of four instances, indicated by the entries "1" through "4".

At this point, though NE state cache 206's OID and instance columns have been completed, the values for each of those instances have yet to be retrieved. That retrieval occurs next at step 404 in FIG. 4. Returning back to FIG. 2, the retrieval from MIB 202 may be executed by a collection module 214 on network element 140.

Collection module 214 may be an SNMP manager that interacts with MIB 202 through SNMP daemon 204. For example, collection module 214 may periodically request values for the instances being watched in NE state cache 206 using an SNMP get request. In addition, collection module 214 may set triggers on SNMP daemon 240 that cause daemon 204 to notify collection module 214 when certain values change. This may be done, for example, using the SNMP trap functionality. In the example above, after collection module 214 has retrieved values for each instance, NE state cache 206 may appear as follows:

| OIDs to Monitor | Instances | Values |
|---|---|---|
| 1.3.6.1.2.1.4.5 (ipInAddrErrors) | NULL | NULL |
| 1.3.6.1.2.1.4.6 (ipForwDatagrams) | 0 | 1,510,650 |
| 1.3.6.1.2.1.2.2.1.2 (ifDescr) | 1 | Ethernet0/0 |
| | 2 | Ethernet0/1 |
| | 3 | VoIP-Null0 |
| | 4 | Loopback3 |

Once the values are collected in NE state cache 206 at step 406, they are transmitted to the network management server 110 at step 408. In FIG. 2, the transmission may be executed by scheduling module 212.

Scheduling module 212 may package up all the instances and values stored in NE state cache 206 together and transmit them to network management server 120. For example, scheduling module 212 may establish a TCP socket connection with network management server 120 and periodically write the contents of NE state cache 206 to the TCP socket connection, pushing the network element data to the network management server. The information to establish the socket connection—such as server 120's network (e.g., IP) address and transport-layer (e.g., TCP) port—may be configured into network element 140. Or the socket information may be sent from network management server 120 to network element 140, for example with the object specifications.

In an embodiment, network environment 200 may have multiple network manager servers 120 mirroring each other, which may enable redundancy. In that embodiment, scheduling module 212 may establish TCP socket connections with each of the network manager servers 120 and may transmit data from NE state cache 206 to each, broadcasting the network element information across the plurality of servers.

While scheduling module 212 can periodically transmit the entire NE state cache 206 to network management server 120, it could also be more selective. For example, network element 140 may have business rules on how frequently to transmit different object data. Some object data may need to be transmitted more frequently than others and the business rules may specify what object data needs to be transmitted at what frequency. Those business rules can be configured on network element 140 or, again, can be transmitted from network management server 122 to network element 140, for example with the object specifications.

When scheduling module 212 transmits the object instances and values to network management server 120, network management server 120 receives the data with a listener module 222. Listener module 222 receives the data from network element 140, for example, by reading a socket connection open from network element 140. On receipt of the data, listener module 222 stores the data into collection database 118, which makes it available for observation through user interface 120.

Intermittently the objects to be observed may need to change. A person skilled in the art would understand that the same process described above for network management server 120 may be used to propagate changes to the objects observed. Network management server 120 may send the object IDs to be added, altered, or removed to network element 140. Network element 140's client configuration module 210 may make alterations to NE state cache 206 to add, alter or remove the specified object IDs. Discovery module 208 updates NE state cache 206 to reflect any instances of objects added or altered. Collection module 214 retrieves values for any instances of objects added or altered. And scheduling module 212 transmits any instances and retrieved values to network management server 120, which stores the data to collection database 116.

Conclusion

Each of the blocks and modules in FIGS. 1 and 2 may be implemented in hardware, software, firmware, or any combination thereof.

Each of the blocks and modules in FIGS. 1 and 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A computer-implemented method for collecting metrics on a network element, comprising:
   (a) receiving, on the network element, a specification of the objects on the network element to monitor;
   (b) querying, on the network element, an object data structure representing management information of the network element to identify new instances of each of the specified objects;
   (c) for respective instances identified in (b), querying, on the network element, the object data structure for metric values associated with the respective new instance; and
   (d) transmitting, from the network element to a network information server over a network, data representing the instance and the associated metric value.

2. The method of claim 1, wherein the transmitting (d) comprises transmitting, from the network element to a plurality of network information servers over the network, the data representing the instance and the associated metric value.

3. The method of claim 1, wherein the receiving (a) comprises receiving the specification from the network information server that looks up the network element in an inventory database with network topology information and transmits the specification in a plurality of network elements selected according to the inventory database.

4. The method of claim 1, wherein the transmitting (d) occurs periodically.

5. The method of claim 1, wherein the transmitting (d) is scheduled according to business rules.

6. The method of claim 5, wherein the transmitting (d) is scheduled according to business rules such that metric values associated with one of the objects are transmitted more frequently than metric values associated with another of the objects.

7. The method of claim 1, wherein the object data structure is hierarchical.

8. The method of claim 7, wherein the specification of objects is a plurality of Object Identifiers (OIDs) formatted according to the Simple Network Management Protocol (SNMP), wherein the data structure is a Management Information Base (MIB) for the network element, and wherein the querying (b) and (c) occurs using SNMP.

9. The method of claim 1, further comprising:
   (e) before the receiving (a), storing, on the network element, objects to monitor based on the received specification, wherein the network element performs the querying (b), the querying (c), and the transmitting (d) periodically based on the stored objects to monitor.

10. A non-transitory computer-readable medium having instructions stored thereon that, when executed by at least one computing device, causes the at least one computing device to perform a method for collecting metrics on a network element, the method comprising:
   (a) receiving, on the network element, a specification of the objects on the network element to monitor;
   (b) querying, on the network element, an object data structure representing management information of the network element to identify new instances of each of the specified objects;
   (c) for respective instances identified in (b), querying, on the network element, the object data structure for metric values associated with the respective new instance; and
   (d) transmitting, from the network element to a network information server over a network, data representing the instance and the associated metric value.

11. The computer-readable medium of claim 10, wherein the transmitting (d) comprises transmitting, from the network element to a plurality of network information servers over the network, the data representing the instance and the associated metric value.

12. The computer-readable medium of claim 10, wherein the receiving (a) comprises receiving the specification from the network information server that looks up the network element in an inventory database with network topology information and transmits the specification in a plurality of network elements selected according to the inventory database.

13. The computer-readable medium of claim 10, wherein the transmitting (d) occurs periodically.

14. The computer-readable medium of claim 10, wherein the transmitting (d) is scheduled according to business rules.

15. The computer-readable medium of claim 10, wherein the object data structure is hierarchical.

16. The computer-readable medium of claim 15, wherein the specification of objects is a plurality of Object Identifiers (OIDs) formatted according to the Simple Network Management Protocol (SNMP), wherein the data structure is a Management Information Base (MIB) for the network element, and wherein the querying (b) and (c) occurs using SNMP.

17. A network element device that collecting metrics, comprising:
   a processor;
   a memory, coupled to the processor, that stores an object data structure representing management information of the network element;
   a client configuration module executed by the processor to receive a specification of the objects on the network element to monitor;
   a discovery module executed by the processor to query, on the network element, the object data structure to identify new instances of each of the specified objects;
   a collection module that, for respective instances identified by the discovery module, queries, on the network element, the object data structure for metric values associated with the respective new instance; and
   a scheduling module that transmits, from the network element to a network information server over a network, data representing the instance and the associated metric value.

18. The device of claim 17, wherein the scheduling module transmits, from the network element to a plurality of network information servers over the network, the data representing the instance and the associated metric value.

19. The device of claim 17, wherein the transmission occurs periodically.

20. The device of claim 17, wherein the scheduling module schedules the transmission according to business rules.

21. The device of claim 17, wherein the object data structure is hierarchical.

22. The device of claim 21, wherein the specification of objects is a plurality of Object Identifiers (OIDs) formatted according to the Simple Network Management Protocol (SNMP), wherein the data structure is a Management Information Base (MIB) for the network element, and wherein the discovery and collection modules use SNMP.

* * * * *